US008028018B2

(12) United States Patent
Kawabe et al.

(10) Patent No.: US 8,028,018 B2
(45) Date of Patent: Sep. 27, 2011

(54) SYSTEM, DEVICE, AND METHOD FOR COOPERATIVE PROCESSING

(75) Inventors: Shigehisa Kawabe, Yokohama (JP); Setsu Kunitake, Yokohama (JP); Akira Suzuki, Yokohama (JP); Katsuhide Tanaka, Yokohama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 856 days.

(21) Appl. No.: 11/289,730

(22) Filed: Nov. 29, 2005

(65) Prior Publication Data
US 2007/0011241 A1    Jan. 11, 2007

(30) Foreign Application Priority Data

Jun. 24, 2005 (JP) ................................ 2005-185416

(51) Int. Cl.
*G06F 15/16* (2006.01)
(52) U.S. Cl. ........................................ 709/202; 709/231
(58) Field of Classification Search .................. 709/202, 709/231
See application file for complete search history.

(56) References Cited

U.S. PATENT DOCUMENTS

| | | | | |
|---|---|---|---|---|
| 5,999,972 | A * | 12/1999 | Gish | 709/219 |
| 6,173,327 | B1 * | 1/2001 | De Borst et al. | 709/231 |
| 6,557,024 | B1 | 4/2003 | Saito et al. | |
| 7,016,966 | B1 * | 3/2006 | Saulpaugh et al. | 709/230 |
| 2001/0016902 | A1 * | 8/2001 | Abdallah et al. | 712/222 |
| 2001/0023480 | A1 * | 9/2001 | Abdallah et al. | 712/221 |
| 2003/0018827 | A1 | 1/2003 | Guthrie et al. | |
| 2003/0117978 | A1 * | 6/2003 | Haddad | 370/331 |
| 2004/0122869 | A1 * | 6/2004 | Muehl et al. | 707/201 |
| 2004/0193687 | A1 | 9/2004 | Christensen et al. | |
| 2005/0060414 | A1 * | 3/2005 | Phillips et al. | 709/227 |
| 2005/0131865 | A1 * | 6/2005 | Jones et al. | 707/2 |
| 2005/0138176 | A1 * | 6/2005 | Singh et al. | 709/226 |
| 2006/0236225 | A1 * | 10/2006 | Achilles et al. | 715/513 |
| 2008/0140695 | A1 * | 6/2008 | DeSelms | 707/102 |
| 2009/0260019 | A1 * | 10/2009 | Suryanarayana et al. | 719/315 |

FOREIGN PATENT DOCUMENTS

| | | |
|---|---|---|
| CN | 1735015 A | 2/2006 |
| JP | 10027164 | 1/1998 |
| JP | 2000076118 | 3/2000 |
| JP | 2003076560 | 3/2003 |
| JP | 2004-295894 | 10/2004 |

OTHER PUBLICATIONS

Office Action in corresponding Chinese Patent Application No. 200610006292.5, with English translation.
Japanese Notice of Grounds for Rejection with English translation issued in connection with corresponding Japanese Application No. 2005-185416, mailed on Feb. 22, 2011.

* cited by examiner

*Primary Examiner* — Patrice Winder
*Assistant Examiner* — Ebrahim Golabbakhsh
(74) *Attorney, Agent, or Firm* — Gesmer Updegrove LLP

(57) ABSTRACT

A cooperative processing system includes a first data processing component, existing on a first computer, that generates an output containing object having a function of outputting data contained therein to a stream, a pipeline section that causes the output containing object to output the data contained in the output containing object to a stream addressed to a second computer, and causes the second computer to generate an input containing object that receives the stream and stores data transferred through the stream, and a second data processing component, existing on the second computer, that receives the input containing object to perform a data process.

29 Claims, 9 Drawing Sheets

SYSTEM, DEVICE, AND METHOD FOR COOPERATIVE PROCESSING

BACKGROUND OF THE INVENTION

1. Field of the Invention

The present invention relates to a distributed data processing technique for causing plural data processing components to perform a series of processes in a cooperative manner.

2. Description of the Related Art

A distributed data processing method for causing plural data processing components to cooperate and perform a series of processes is known. According to this method, information on a procedure of a cooperative process and information on an intermediate result are circulated as a transfer information unit through a network while each node for performing each partial process and holding the result acquires the transfer information unit from the network. Based on the procedure information of the transfer information unit, part of the cooperative process is performed using the result of the partial process held by the node and the acquired intermediate result, so that in accordance with the result the intermediate result information is updated, and sent together with the procedure information to the network.

A system for acquiring a result of complex processing by causing a process server operative on an HTTP server to process a material file on a web server and plural process servers to cooperate upon processing is also known. In this system, a web browser sends a request with a first virtual URL (Uniform Resource Locator) having the material file qualified with a procedure name, a parameter, a computer name, and the like. A composite process formed by a combination of plural partial processes is denoted by the first virtual URL. For forming a composite process, a partial process is expressed as a second virtual URL, which is described in the first virtual URL as an argument. Thus, using a virtual URL as an argument, another virtual URL expressing a composite process can be formed in a hierarchical manner, as if forming a functional composition. Each process server interprets a virtual URL addressed thereto, and extracts the unprocessable argument (virtual URL) included therein, and transfers it to a second process server capable of processing the argument as a request in HTTP (Hypertext Transfer Protocol). A first process server acquires the process result as a response, and uses it for its own process as input data. Thus, the input virtual URL is regarded as a multiple-nested computing process, so that the processes can be performed from the innermost one in sequence in a distributed manner. In this case, the components are connected in the HTTP protocol to communicate with each other to achieve distributed pipeline processing.

Also, a method of processing an externally applied HTTP request through cooperative processing by plural HTTP modules in an event-driven manner in a single application run on a single host computer is known. According to this method, an HTTP request from an external source is logically expressed to produce a context object for encapsulating at least one property related to the HTTP request. An event pipeline having plural request events, each having a corresponding event and corresponding to a context object, is formed. When an event corresponding to the request event occurs, and when at least one of an application and a module is registered in association with that request event, a callback is produced, and in response to the callback for processing the context object, each application and each module registered in association with the request event are initiated.

In the method for causing plural data processing components to cooperate and perform a series of processes described above, the data entity of the intermediate result is included in the transfer process unit circulated through the network, and therefore each process component must be programmed in view of communication for transmitting and receiving the data entity of the intermediate result. Consequently, this method is associated with a problem of complex programming of the process component.

This problem occurs also upon cooperation among plural data processing components in a single computer device. The pipeline processing function provided by an operating system (OS) such as UNIX (registered trademark) achieves cooperative processing by first using the OS to activate each program forming a pipeline in concurrent way, connecting a standard output stream of the program to a standard input stream of a next program in the pipeline. Such a method, however, requires each component to achieve data communication in a stream, and therefore cannot be adapted to simple programming for invoking a method using as an argument data or an object which is not in the form of a stream.

For cooperation among data processing components via a network, the data of the intermediate result is passed via the network using a network communication protocol, such as HTTP. In the network communication protocol of this kind, data transferred through the network is usually in the form of a stream. The function of transmitting and receiving a stream is generally hard to program. What is important about the data processing component is the content of the process to be performed, and input/output control for the process is a secondary matter. Using programming resources for such a secondary input/output control is not desirable. For example, a vendor developing a data processing component for implementing an individual business logic acting as an element of a work flow system usually focuses on programming of the business logic, and does not wish to allocate resources for programming of input/output control.

According to the method for acquiring a result of complex processing described above, each data processing component must be implemented to receive an HTTP request as input and transmit an HTTP response as output, and therefore the same problem arises.

The method of processing an externally applied HTTP request through cooperative processing by plural HTTP modules described above causes cooperation among HTTP modules in the same host computer, particularly in the same application, and therefore cannot be applied to cooperation among the processing components in different host computers via a network without modification. In other words, an object to be processed can be directly passed among the HTTP modules in the same host computer, but such a simple data passing method cannot be implemented for the communication through the network.

SUMMARY OF INVENTION

The present invention provides a technique, used in a cooperative processing system for cooperation among plural data processing components via a data communication network, for achieving cooperation through passing of data via the network even among data processing components having no data input/output mechanism dealing with a stream.

According to an aspect of the invention, there is provided a cooperative processing system that includes a first data processing component, existing on a first computer, that generates an output containing object having a function of outputting data contained therein to a stream, a pipeline section that causes the output containing object to output the data contained in the output containing object to a stream addressed to a second computer, and causes the second computer to generate an input containing object that receives the stream and stores data transferred through the stream, and a second data processing component, existing on the second computer, that receives the input containing object to perform a data process.

According to another aspect of the invention, there is provided a storage medium readable by a first computer. The storage medium stores a program of instructions executable by the first computer to cause a first computer to perform a function as a first data processing component that executes a first data process, and outputs an output containing object having a function of outputting data obtained through the first process as a stream, and an output-side pipe section that causes the output containing object to output the data contained in the output containing object as a stream addressed to a second computer when the data obtained through the first process executed is provided to a second data processing component on the second computer to execute a second data process.

According to another aspect of the invention, there is provided a storage medium readable by a computer. The storage medium stores a program of instructions executable by the computer to cause the computer to perform a function. The function includes producing an input containing object that receives a stream from an external device and stores data transferred through the stream, receiving the stream from an external device, and executing a data processing using the input containing object.

According to another aspect of the invention, there is provided a computer device that includes a first data processing component that executes a first process, and outputs an output containing object having a function of outputting data obtained through the first process as a stream, and an output-side pipe section that causes the output containing object to output the data contained in the output containing object as a stream addressed to a second computer device when the data obtained through the first process is provided to a second data processing component on the second computer device to execute a second process.

According to another aspect of the invention, there is provided a computer device that includes a first data processing component that executes a first process, an input-side pipe section that produces an input containing object that receives a stream from an external device and stores input data transferred through the stream, and a process instructing section that causes the first data processing component to process the input data by inputting the input containing object to the first data processing component.

According to another aspect of the invention, there is provided a cooperative processing method that includes generating an output containing object as an output of a first data processing, outputting data contained in the output containing object to a stream addressed to a second computer, generating an input containing object that receives the stream and stores the data transferred through the stream, outputting the data contained in the input containing object, and executing a second data processing using the data outputted from the input containing object.

BRIEF DESCRIPTION OF THE DRAWINGS

An embodiment of the present invention will be described in detail based on the following figures, wherein.

DETAILED DESCRIPTION OF THE INVENTION

An embodiment of the present invention will be described with reference to the accompanying drawings.

Figure 1:
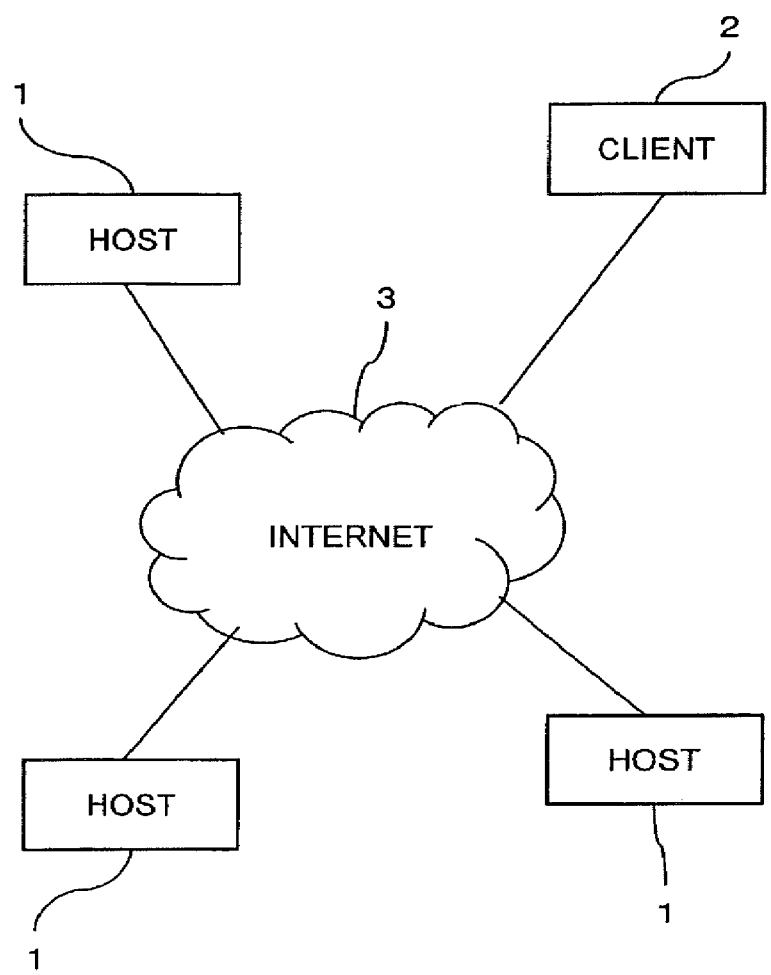
FIG. 1 schematically shows a network system to which the present invention is applied.

In this embodiment, in response to a request from a client 2, plural host computers (hereinafter referred to as "hosts") 1 cooperatively perform processing through a network allowing use of HTTP, such as Internet 3, as shown in FIG. 1.

Figure 2:
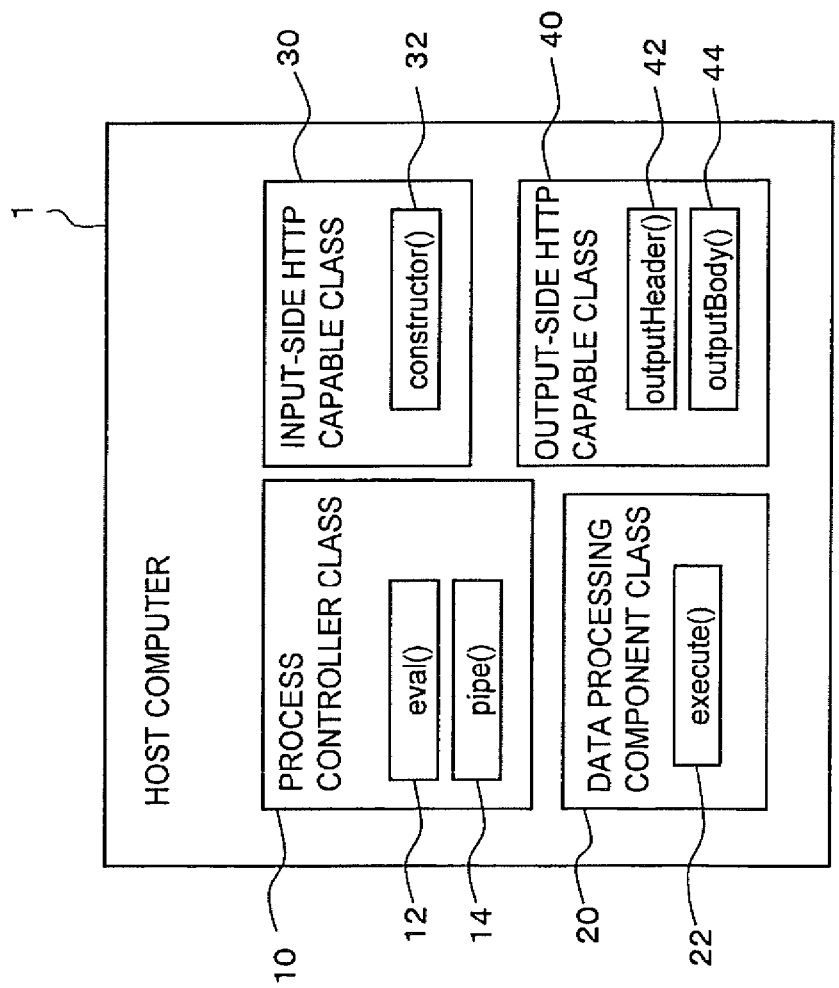
FIG. 2 shows an example of a configuration of program modules included in each host computer forming a system.

Referring to FIG. 2, each host 1 has software for cooperative processing, this software including four classes of objects, i.e. a process controller class 10, a data processing component class 20, an input-side "HTTP capable" class 30, and an output-side "HTTP capable" class 40.

The data processing component class 20 is an object class of a data processing component performing a unitary data process. The content of the unitary data process (hereinafter referred to as a "unit process") is not particularly limited. There are many possible unit processes, such as summarization of a document, merging of plural documents. The data processing component class 20 includes an execute method 22 ("execute( )") for instructing execution of a unit process defined by the data processing component. The class of an individual and specific unit process, such as document summarization or document merging, is implemented as a descendant class inheriting the data processing component class 20. By invoking the execute method 22 of the object of the individual and specific unit process, it is made possible to cause the object to perform that unit process. The system of the present embodiment achieves a series of data processes for the service provided to the client 2 by cooperation of the data processing components for the individual and specific unit processes across the network, such as the Internet 3. Note that the data processing component class 20 and the descendant component class for the individual and specific process may have other methods than the execute method 22.

The data processing component class 20 and the descendant class thereof, i.e. the individual and specific process component class, is formed so as to take an object of the input-side HTTP capable class 30 (or a descendant class thereof) described hereinafter as input data to be processed, and output an object of the below-described output-side HTTP capable class 40 as a process result. These classes need not have a function (method) for data stream input/output.

The process controller class 10 is an object class controlling cooperation among the plural data processing components, and can be implemented as, for example, a Java (registered trademark) servlet. The main role of the process controller class 10 is to activate the object of the data processing component corresponding to the process instructed by the client 2 or another host 1 to cause it to execute the process. The process controller class 10 has an "eval" method 12 ("eval( )") and a "pipe" method 14 ("pipe( )").

The "eval" method 12 is a method used to invoke the object of the process controller class 10 on the host 1 by the client 2 or another host 1. Arguments of this method include information indicating the content of a process to be executed by the host 1, such as an identifier of the individual and specific data processing component and a process parameter provided to the component. Further, a script specifying the order of processes performed by the plural data processing components and identifying information of the script can be designated as the argument of the eval method 12. For the latter case, the object of the process controller class 10 acquires and uses script entity data corresponding to the identifying information of that script from a script server provided in the host 1 or on the network.

The "pipe" method 14 is a method for passing a process result of a data processing component on a certain host 1 to a data processing component on another host 1 through the network, such as the Internet 3. While various communication protocols can be used for passing data through the network, an example using HTTP will be described below.

By way of example, there are two possible methods for passing data through the network. One of them is called a Push method in which the host finishing execution of a process in a preceding stage sends an HTTP request for execution of the next process to a host in the subsequent stage, and the data resulting from the process executed by the preceding host (i.e. data to be processed by the subsequent host) is transferred through a stream of the HTTP request. The other is called a Pull method in which the host to execute a process in the subsequent stage sends an HTTP request for data to be processed to the host which has executed a process in the preceding stage, and the preceding host transfers the process result data to the subsequent host in an HTTP response to the request. Either of the two methods can be employed for the present embodiment. The pipe method 14 is invoked to achieve data transfer in the selected one of the two methods. In the Push method, for example, as a result of the HTTP request being transmitted to the host to execute a process in the subsequent stage from the host which has executed a process in the preceding stage, the pipe method 14 of the process controller class 10 in the subsequent host is invoked. In the Pull method, the pipe method 14 of the process controller class 10 in the preceding host is invoked by the HTTP request from the subsequent host asking the preceding host to provide process result data. Note that both of the Push and Pull methods can be allowed in a single system by arranging different "methods" for the Push and Pull methods.

The pipe method 14 itself need only have the function of issuing an HTTP request (and an HTTP response for the Pull method), and the function to transmit and receive a process result of the data processing component as an HTTP stream is not required. Such a function of transmitting and receiving a stream can be performed by the output-side HTTP capable class 40 and the input-side HTTP capable class 30 described hereinafter.

The process controller class 10 may have other methods than the eval method 12 and the pipe-method 14.

While the function of transmitting data through a network is implemented as the pipe method 14 of the process controller class 10 in this example, alternatively a pipeline class different from the process controller class 10 may be defined so that the data transfer function via the network can be implemented by an object of this pipeline class.

The output-side capable class 40 is an object class having a function of holding process result data output from the data processing component, and outputting the data held therein through an HTTP stream. An object of the data processing component class 20 or a descendant class thereof in the present embodiment outputs an object of the output-side HTTP capable class 40 (hereinafter referred to as an output-side HTTP capable object) as a result of data processing by the object. More specifically, the output-side HTTP capable object output from the data processing component object as a process result holds process result data of the data processing component object. The process result data includes either one, or both, of HTTP header and body information. The output-side HTTP capable class 40 has an outputHeader method 42 ("outputHeader( )") for outputting the HTTP header information, and an outputBody method 44 ("outputBody( )") for outputting the HTTP body information. The outputheader method 42 and the outputBody method 44 take as an argument (the identifier of) the data output stream to which the data of the HTTP header and the HTTP body is output. Other devices, programs, and objects invoke the outputHeader method 42 of the output-side HTTP capable object with the data output stream designated as an argument, so that the HTTP header in the data held by the output-side HTTP capable object (i.e. the process result of the data processing component object producing that object) can be output onto the data output stream from the object. Similarly, by invoking the outputBody method 44 of the output-side HTTP capable object with the data output stream as an argument, the data of the HTTP body held by the object can be output onto the data output stream.

While the data output component has been described above as outputting the object of the output-side HTTP capable class 40 as a process result, the present invention is not limited thereto, and a descendant class inheriting the output-side HTTP capable class 40 may be output as the process result. In the following description, an object of the descendent class will also be referred to as an "output-side HTTP capable object" as long as there is no need to make a distinction between the two.

The input-side HTTP capable class 30 is an object class receiving data sent to the data processing component through the network, such as the Internet 3, as an HTTP stream. More specifically, the class 30 is an object class for receiving and holding input data to the data processing component sent as an HTTP stream in place of the data processing component. The input-side HTTP capable class 30 has a constructor method 32 ("constructor( )"). The constructor method 32 is a method for producing an object of the input-side HTTP capable class 30 (hereinafter referred to as an input-side HTTP capable object). The constructor method 32 takes the data input stream as an argument. Other devices, programs, and objects can produce the input-side HTTP capable object by invoking the constructor method 32 of the input-side HTTP capable class 30 designating a data input stream as an argument. The produced input-side HTTP capable object receives data from the data input stream in accordance with HTTP, and stores it therein. By receiving the input-side HTTP capable object as an argument, the data processing component acquires data held in the object, and performs a process of the component on the data.

While the data to be processed which is sent via the network is received by the object of the input-side HTTP capable class 30 according to the above description, the present invention is not limited to such a configuration, and it may be received by an object of a descendent class inheriting the input-side HTTP capable class 30. In the following description, an object of the descendent class will also be referred to as an "input-side HTTP capable object" unless distinction between the two is necessary.

The term "HTTP capable" in the name of the classes 30 and 40 described above refers to the fact that the class allows data input/output to/from an HTTP stream, and can hold data in the HTTP compliant form. An object of an HTTP capable class 50 can be regarded as an encapsulated HTTP request in the sense that it can read an HTTP request, and analyze and hold data in accordance with a predetermined data type, and can reproduce the HTTP stream from the data held in itself as required. Although the context object in the technique of processing an externally applied HTTP request through cooperative processing by plural HTTP modules described above is an encapsulated HTTP request, it is only the encapsulated property of the HTTP request, does not necessarily include process result data or the data to be processed by the component, and does not have the function of reproducing such data as an HTTP stream.

Note that the input-side and output-side HTTP capable classes 30 and 40 and the descendant classes thereof may have other methods than those described above.

Figure 3:
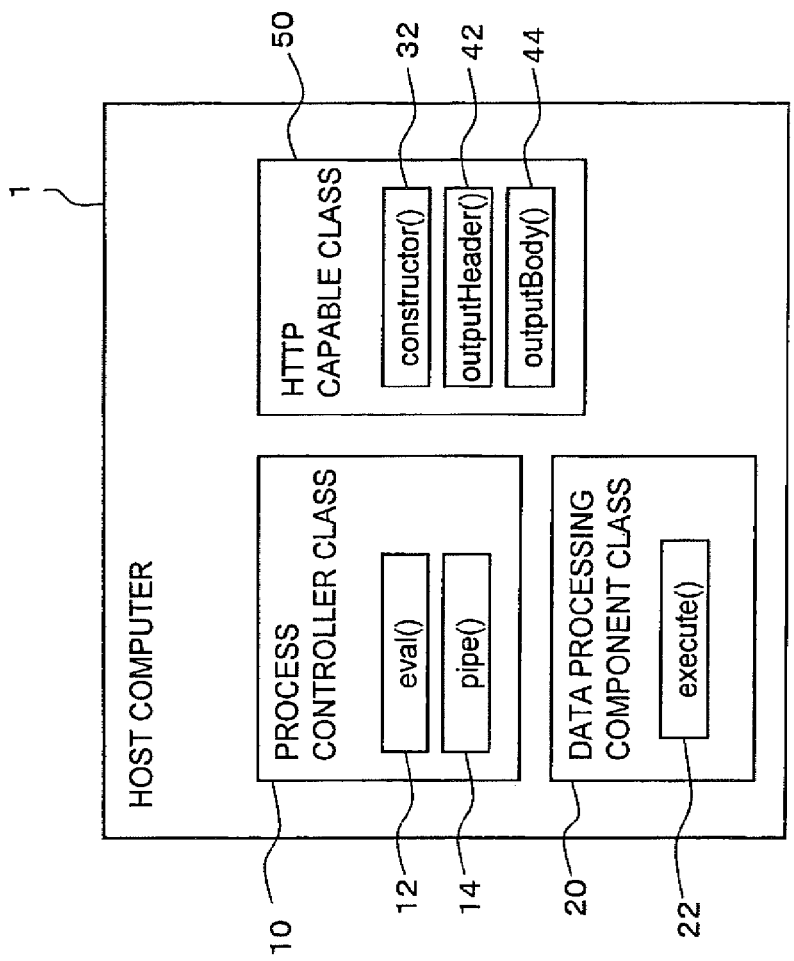
FIG. 3 shows another example of a configuration of the program modules included in each host computer forming the system.

While two classes, namely the input-side and output-side HTTP capable classes 30 and 40, are provided in the above example, alternatively the HTTP capable class 50 shown in FIG. 3 having all of the constructor method 32, the outputHeader method 42, and the outputBody method 44 may be provided. An object of the HTTP capable class 50 and the descendant class thereof can perform functions of both the input-side and output-side HTTP capable objects described above.

While the software configuration of the host 1 forming the cooperative processing system has been described above, a hardware configuration of the host 1 may be similar to that of a common general-purpose computer.

The flow of a cooperative process among data processing components on the plural hosts 1 will be described. As described above, the cooperative process can be roughly divided into two methods, i.e. Push and Pull methods, depending on how the process result of one data processing component (the intermediate result of the whole cooperative process) is passed to another data processing component via the network. The cooperative process in the Push method will first be described.

Figure 4:
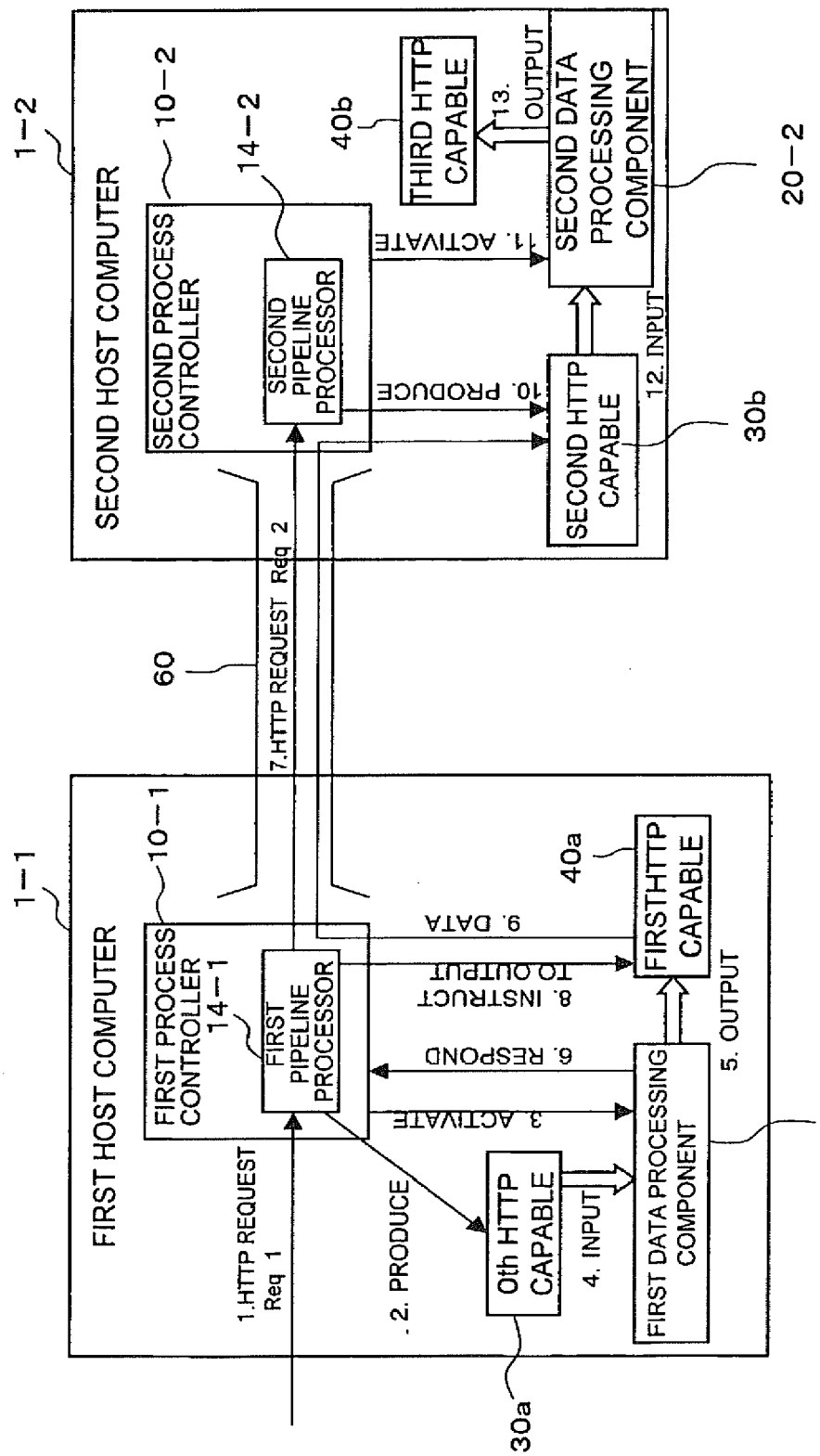
FIG. 4 is a diagram for describing a flow of a cooperative process used when an intermediate result is passed in a Push method.

FIG. 4 shows a flow of the cooperative process in which a process result of a data processing component (object) 20-1 on a first host 1-1 is passed according to the Push method by an HTTP request to another data processing component 20-2 in a remote second host 1-2. The flow will be described in sequence.

1. An HTTP request Req1 requesting a process arrives from an external device, such as the client 2 or another host 1. The HTTP request Req1 is made of, for example, the following URL by a device sending the request:

$$\text{http://host1.domain/} \\ \text{Evaluator?method=eval\&script=script1.groovy} \quad (1)$$

In this URL, "host1" is the name of the first host 1-1, "domain" indicates the name of the domain where the host 1-1 is present, and "Evaluator" indicates the class name of the process controller class 10. Further, in a query section (the section following "?"), "method=eval" indicates the invoked method 12 "eval", and "&script=script1.groovy" indicates the name "script1.groovy" of the script processed by the eval method 12.

In the first host 1-1 receiving the HTTP request Req1 corresponding to such a URL, a first process controller 10-1, which is an object of the process controller class 10, is produced. The eval method 12 of the first process controller 10-1 acquires the script corresponding to the script name designated in the request Req1 from a script server on the network or the first host 1-1, and executes the instructions indicated by the script in sequence. A specific example of script description will be shown in the following:

$$\text{id0=Component1.execute(url1);} \quad (2)$$

$$\text{id1=Evaluator.eval(host1, "scriptA.groovy", id0)} \quad (3)$$

$$\text{id2=Evaluator.eval(host2, "scriptB.groovy", id1)} \quad (4)$$

The script description is formed of the three expressions (2), (3), and (4), and is part of the script performed by the eval method 12 of the first process controller 10-1 in the first host 1-1 (it is assumed that the host name thereof is "host0"). It is also assumed that the host name of the second host 1-2 is "host1", and that of a third host not shown in FIG. 4 is "host2". "Component1" is the class name of the first data processing component 20-1, and "Evaluator" is the class name of the process controller class 10. For example, the expression (2) indicates that the first data processing component 20-1 in the first host 1-1 is caused to execute a process on data available from the URL indicated by "url1". An identifier of a first HTTP capable object 40a which is a process result of the component 20-1 is set as a variable "id0". The instruction in the expression (3) is an instruction for the second host "host1" to execute the script "scriptA.groovy" using the object 40a indicated by "id0" as an argument, and set an identifier of the output-side HTTP capable object, i.e. execution result, (that is, a final process result of a series of data processing components indicated in the script) as a variable "id1". The instruction in the expression (4) is an instruction for the third host "host2" to execute the script "scriptB.groovy" with the process result indicated by the variable "id1" as the data to be processed.

While a control structure, such as iteration and conditional branch, can be described in the script, explanation thereof is omitted here. The cooperative process among plural data processing components using a script is described in detail in Japanese Patent Application No. 2004-321445 (applied on Nov. 5, 2004) copending with the present application, and the specification, claims, drawings, and abstract of this application will be incorporated herein by reference.

Thus, each instruction in the script includes the data processing component to be activated, and an argument indicating input data to the data processing component. Therefore, in the course of executing the instruction in the script in sequence, the first process controller 10-1 activates (i.e. produces an instance) the data processing component indicated by the instruction (the first data processing component 20-1), and causes the component to execute the process.

While the script to be executed by the first host 1-1 is specified in the HTTP request Req1 in the above example, the request Req1 may specify the unit process to be executed by the first host 1-1 (the first data processing component 20-1 in this example) instead of the script.

2. When the data processing component activated by the first process controller 10-1 needs data to be processed, the data to be processed must be obtained and converted to the form allowing input to the component prior to activation of the component. Therefore, as a receiver of input data to deal with the HTTP request Req1, a first pipeline processor 14-1 of the first process controller 10-1 produces a $0^{th}$ HTTP capable object 30*a*, which is an object of the input-side HTTP capable class 30 or the HTTP capable class 50. The first pipeline processor 14-1 is a program module performing a function of the pipe method 14.

Data input to the first data processing component 20-1 is included in the HTTP request Req1 from, for example, an external device. When, for example, the method name or the script name of the argument thereof in the above-described URL example (1) in the HTTP request Req1 is followed by the input data entity, the first pipeline processor 14-1 can produce the $0^{th}$ HTTP capable object 30*a* by invoking the constructor method 32 using the stream name of the HTTP stream formed by the HTTP request Req1 as an argument. The produced $0^{th}$ HTTP capable object 30*a* receives and holds the HTTP stream data (more strictly speaking, the data portion following the above-described method name and the argument). When a reference (such as a URL of the input data), rather than the input data entity, is included in the HTTP request Req1, the first pipeline processor 14-1 sends an HTTP request for input data to a data source indicated by the reference, and invokes the constructor method 32 using as an argument the HTTP stream of a response thereto from the data source, thereby producing the $0^{th}$ HTTP capable object 30*a*. A reference to input data to the data processing component may be described in an instruction in the script as an argument of a method. Such a case can similarly be dealt with by an approach where the first pipeline processor 14-1 issues an HTTP request for the data indicated by the reference, so that the object 30*a* receiving a response thereto can be produced.

3. After the $0^{th}$ HTTP capable object 30*a* is produced, the first process controller 10-1 invokes the execute method 22 of the first data processing component 20-1, which should process data of the object 30*a*, using as an argument an identifier of the object 30*a*, thereby activating the first data processing component 20-1.

4. The activated first data processing component 20-1 receives data held by the $0^{th}$ HTTP capable object 30*a*, and executes a process on the data.

5. The first data processing component 20-1 then outputs the first HTTP capable object 40*a* holding data of the process result. The object 40*a* is an object of the output-side HTTP capable class 40 or the HTTP capable class 50. By way of example, this output process can be implemented by the first data processing component 20-1 invoking the constructor method 32 using the data output stream of its own as an argument.

6. After executing its process, the first data processing component 20-1 sends a response including the status of the process result back to the first process controller 10-1. When the process is successful, the response includes the identifier of the first HTTP capable object 40*a* output by the component 20-1.

7. When the script being executed by the first process controller 10-1 includes description of an instruction to execute a script run on the second host 10-2 (such as in the above expression (3)) after the execution instruction of the first data processing component 20-1, or description of an execution instruction of the second data processing component 20-2 on the second host 10-2, the first process controller 10-1 instructs the first pipeline processor 14-1 to issue a process request to the second host 10-2. Receiving the request, the first pipeline processor 14-1 issues an HTTP request Req2 for asking a second pipeline processor 14-2 of the second host 10-2 to execute the second data processing component 20-2. When, for example, the above expression (3) is to be executed, the first process controller 10-1 produces and issues the HTTP request Req2 addressed to the second host 10-2 and including the destination host and the script name indicated by the expression.

8. The first pipeline processor 14-1 invokes the output-Header method 42 and/or the outputBody method 44 of the first HTTP capable object 40*a* (indicated by the variable "id0" in the expressions (2) and (3)) in sequence using as an argument an HTTP stream 60 formed by issuing the HTTP request Req2, thereby instructing the first HTTP capable object 40*a* to output data.

9. In response to the output instruction, the first HTTP capable object 40*a* outputs the data held by itself to the HTTP stream 60.

10. On the other hand, the second host 10-2 activates the second process controller 10-2 provided with the second pipeline processor 14-2 performing the above-described pipeline function in response to the HTTP request Req2 from the first host 10-1. Using the HTTP stream 60 as an argument, the second pipeline processor 14-2 invokes the constructor method 32 to produce a second HTTP capable object 30*b* of the input-side HTTP capable class 30 or the HTTP capable class 50. The produced second HTTP capable object 30*b* acquires and holds data (either or both the HTTP header and the HTTP body) input from the HTTP stream 60. The second HTTP capable object 30*b* formed through this process becomes a replica (duplicate) of the first HTTP capable object 40*a* on the first host 1-1.

11. After a successful production of the second HTTP capable object 30*b*, the second process controller 10-2 executes the script specified by the request Req2 using the second HTTP capable object 30*b* as input data. For example, when the first process in the script is execution of the second data processing component 20-2 with the object 30*b* as an argument, the second process controller 10-2 activates the second data processing component 20-2 using an identifier of the object 30*b* as an argument.

12. The activated second data processing component 20-2 acquires data held by the object 30*b*, and performs the process to be executed by the component 20-2 itself on the data.

13. The second data processing component 20-2 outputs the process result as a third HTTP capable object 40*b* of the output-side HTTP capable class 40 or the HTTP capable class 50. The second data processing component 20-2 sends an identifier of the object 40*b* back to the second process controller 10-2.

The data held by the object 40*b* is passed to a subsequent data processing component to perform a process on the data. When the subsequent data processing component is on the first host 10-1 which has issued the HTTP request Req2, the data held by the object 40*b* is put in a stream of the HTTP response to the HTTP request Req2 and returned to the first host 10-1. When the subsequent data processing component is on another host, the second pipeline processor 14-2 issues an HTTP request to the pipeline processor of the host of interest similarly to the above-described process, so that the data of the object 40*b* can be transferred through the HTTP stream.

While the process flow for passing the process result of the data processing component between the first and second hosts 10-1 and 10-2 in the Push method has been described, a flow of such a pass in the Pull method will be described with reference to FIG. 5.

Two kinds of HTTP requests are passed between the hosts 1-1 and 1-2 in the Pull method. More specifically, there are an HTTP request Req4 (hereinafter referred to as a request for processing) sent from the first host 1-1 finished execution of a certain process to the second host 1-2 executing the next process to ask for execution of a subsequent process, and an HTTP request Req5 (request for data) sent from the second host 1-2 to the first host 1-1 to ask for material data (i.e. the process result of the first host 1-1) used for the subsequent process. The request Req4 for execution of a process includes designation of a script to be executed by the destination host or the data processing component, and a reference to the target data (such as an identifier of the output-side HTTP capable object having the target data), but does not include the entity of the target data. The request Req5 for the target data includes information of the reference.

A flow of a cooperative process in the Pull method will be described in sequence. As the Pull method is similar to the Push method except for the flow of passing the process result between the data processing components, description of those steps that are the same as those of the push method will not be repeated.

1. The HTTP request Req3 for processing arrives from an external device (the client 2 or another host 1) to the first host 10-1. The request for processing Req3 includes information designating the data processing component to be executed by the first host 1-1 or the script to be processed by the first host 1-1.

2. In accordance with the designation of the data processing component to be executed or the script in the request Req3, the first process controller 10-1 activates and instructs the first data processing component 20-1 to execute a process. Although not shown in the figure, when the first data processing component 20-1 needs the data to be processed and reference information indicating the data to be processed is included in the request Req3, similarly to the Push method the first process controller 10-1 acquires the data to be processed from the data source indicated by the reference information, stores the data in the input-side HTTP capable object, and activates the first data processing component 20-1 using this input-side HTTP capable object as an argument.

3. A process result of the first data processing component 20-1 is output as the first HTTP capable object 40a which is the output-side HTTP capable object.

4. After finishing the process, the first data processing component 20-1 sends a response including an identifier of the first HTTP capable object 40a, i.e. the process result, back to the first process controller 10-1.

5. If the second data processing component 20-2 on the second host 10-2 must be executed after the first data processing component 20-1, the first process controller 10-1 issues the HTTP request Req4 instructing execution of the process component. In order for the second data processing component 20-2 to identify the data to be processed, the HTTP request Req4 includes information, such as identifying information of the first data processing component 20-1 (instance object) or the identifier of the first HTTP capable object 40a as an argument.

6. Receiving the HTTP request Req4, the second process controller 10-2 of the second host 1-2 causes, prior to activation of the second data processing component 20-2, the second pipeline processor 14-2 to send to the first host 1-1 the HTTP request Req5 asking for the data to be processed by the component. The HTTP request Req5 includes the identifying information specifying the data to be processed. The identifying information can be obtained from the HTTP request Req4.

7. Receiving the HTTP request Req5, the first pipeline processor 14-1 of the first host 1-1 sends an HTTP response Res1 to the request Req5 back to the second pipeline processor 14-2.

8. The first pipeline processor 14-1 identifies the first HTTP capable object 40a corresponding to the identifying information included in the HTTP request Req5, and invokes one or both of the outputHeader method 42 and the outputBody method 44 of the object 40a using an HTTP stream 70 of the HTTP response Res1 as an argument, thereby instructing the first HTTP capable object 40a to output data.

9. In response to the output instruction, the first HTTP capable object 40a outputs data held therein to the HTTP stream 70.

10. Meanwhile, in response to the HTTP response Res1 from the first host 10-1, the second pipeline processor 14-2 of the second host 10-2 invokes the constructor method 32 using the HTTP stream 70 as an argument, thereby producing the second HTTP capable object 30b, an input-side HTTP capable object. The produced second HTTP capable object 30b acquires and holds data input from the HTTP stream 70.

The subsequent steps 11-13 are the same as those of the Push method.

Figure 6:
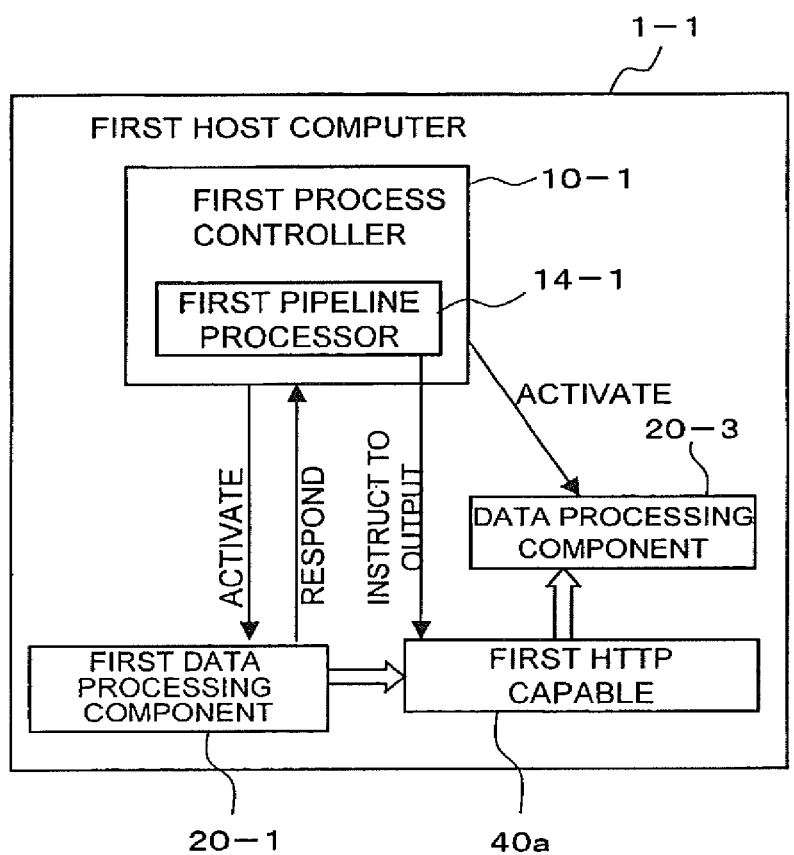
FIG. 6 is a view for describing how a process result is passed among data processing components in the same host computer.

While two methods for passing the process result of the data processing component between different hosts via a network have been described above, the process result may be passed between different data components in the same host. In such a case, the first process controller 10-1 activates the next data processing component 20-3 using as an argument the identifier of the first HTTP capable object 40a, i.e. the process result of the first data processing component 20-1, as shown in FIG. 6.

As described above, according to the present embodiment, input/output control of the HTTP stream is performed by the input-side HTTP capable object or the output-side HTTP capable object, whereby the data processing component performing a unit process need simply be programmed to input/output data of the object type thereof. More specifically, according to the present embodiment, data input/output through the HTTP stream can be replaced with data input/output of the object type, rather than the stream type, thereby simplifying development of the data processing component and enhancing productivity.

Although each host 1 executes a script where one or more execution instructions of a data processing component or execution instructions of another script are arranged in the above example, the present invention is not limited to a case using such a script. For example, execution of the data processing component in a certain host can be directly instructed (not via the script) from another host. In this case, the process controller class 10 executing the script is not essential. In place of the process controller class 10, an object class implementing the function of the pipeline processor 14-1, 14-2 may be provided for each host 1. Alternatively, the data processing component class 20 may incorporate the pipe method performing the pipeline function.

A modification of the present embodiment will next be described.

A first modification will first be described. Although not specifically mentioned in the above embodiment, the HTTP capable object (either the input-side or the output-side) can be provided with a data type. For example, an HTTP capable object of the binary type interprets the body part (HTTP body) of an HTTP stream of an HTTP request or response (input-side), or process result data of the data processing component (output-side) as binary data, and holds it as a byte string. Similarly, an HTTP capable object of the text type holds input data from the HTTP stream or the process result data of the data processing component as a character string. An HTTP capable object of the XML (extensible Markup Language) type interprets input data from the HTTP stream or the process result data of the data processing component as XML data expressed as a text, parses the XML data, and holds the parse result as a parse tree. An HTTP capable object of the CSV (Comma Separated Value) type interprets input data from the HTTP stream or the process result data of the data processing component as CSV data expressed as text data, parses the CSV data, and holds it as a two-dimensional table structure (2D array). The HTTP capable object of each type provides an access method in accordance with the data held therein. For example, the HTTP capable object of the CSV type provides a method for specifying an index in the 2D array to access the data of interest.

Figure 7:
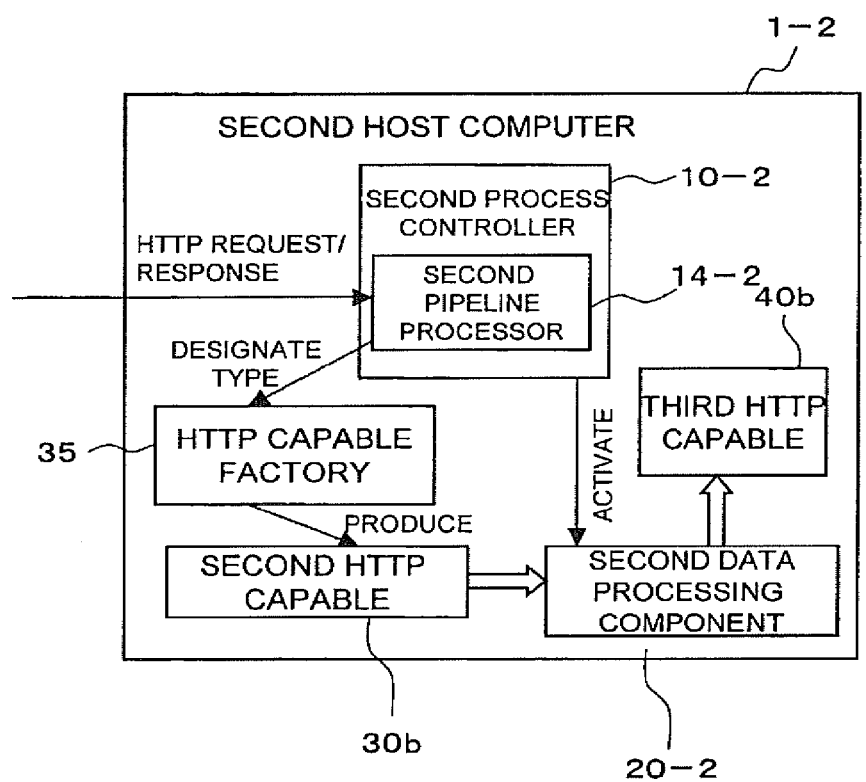
FIG. 7 is a view for describing data type control of an HTTP capable object according to first and second modifications.

In order to deal with the HTTP capable objects implemented to vary in accordance with the data type, according to the first variation, the header output method "outputHeader" of the output-side HTTP capable object is designed to output the data type of the object itself as an HTTP entity type of a header in an HTTP request or response (the value section of the header property ContentType; the MIME (Multipurpose Internet Mail Extensions) media type). As shown in FIG. 7, a host (the second host 1-2 is shown in FIG. 7 as a representative example) is provided with an HTTP capable factory 35. The HTTP capable factory 35 analyzes the HTTP entity type included in the header information of the received HTTP stream, and activates the constructor method of the input-side HTTP capable object of the specified data type. As a result, the second HTTP capable object 30b which is guaranteed to have the same data type as the output-side first HTTP capable object 40a can be produced, and the object 30b can be used as an argument of the second data processing component 20-2.

A second modification will next be described.

In the above-described first modification, the HTTP capable factory 35 of the receiving host 1 produces the input-side HTTP capable object of the same data type as that of the output-side HTTP capable object of the sending host 1. However, the data type of the object output as the process result by the sending first data processing component 20-1 is not necessarily the same as the data type of the object received as input by the second data processing component 20-2 using the process result of the first data processing component 20-1. For example, XML data can be interpreted either as simple text data (character string) or binary data (byte string). Therefore, data transmitted from the HTTP capable object of the XML type can be not only received by the XML type HTTP capable object but also received and processed by the text type or binary type HTTP capable object. Thus, even if the data type is not the same between preceding and subsequent data processing components, data can sometimes be passed for cooperative process between the data processing components.

In such a case, in the second modification, data type conversion (casting) of the HTTP capable objects is performed. The function block for this purpose is the same as that of the first modification shown in FIG. 7. The function of the second pipeline processor 14-2, however, is different from that in the first modification.

More specifically, in the second modification, upon production of the second HTTP capable object 30b, the second pipeline processor 14-2 of the second host 1-2 inquires of the second data processing component 20-2 processing the object 30b or the second process controller 10-2 activating and controlling the data component 20-2 as to the data type of the argument (input-side HTTP capable object) requested by the component 20-2. For this purpose, Reflection API (Application Programming Interfaces), one of the Java (registered trademark) APIs, can be used. The second pipeline processor 14-2 specifies to the HTTP capable factory 35 the data type acquired through the inquiry. As a result, the HTTP capable factory 35 produces the second HTTP capable object 30b having the data type specified by the second pipeline processor 14-2 in place of the entity type acquired by the HTTP request or response from another host, and uses it as an argument of the data processing component 20-2.

The relationship between the data types that allows casting is fixed, and therefore the above described cast operation is performed only on the data types between which casting is possible.

A third modification will next be described.

Figure 5:
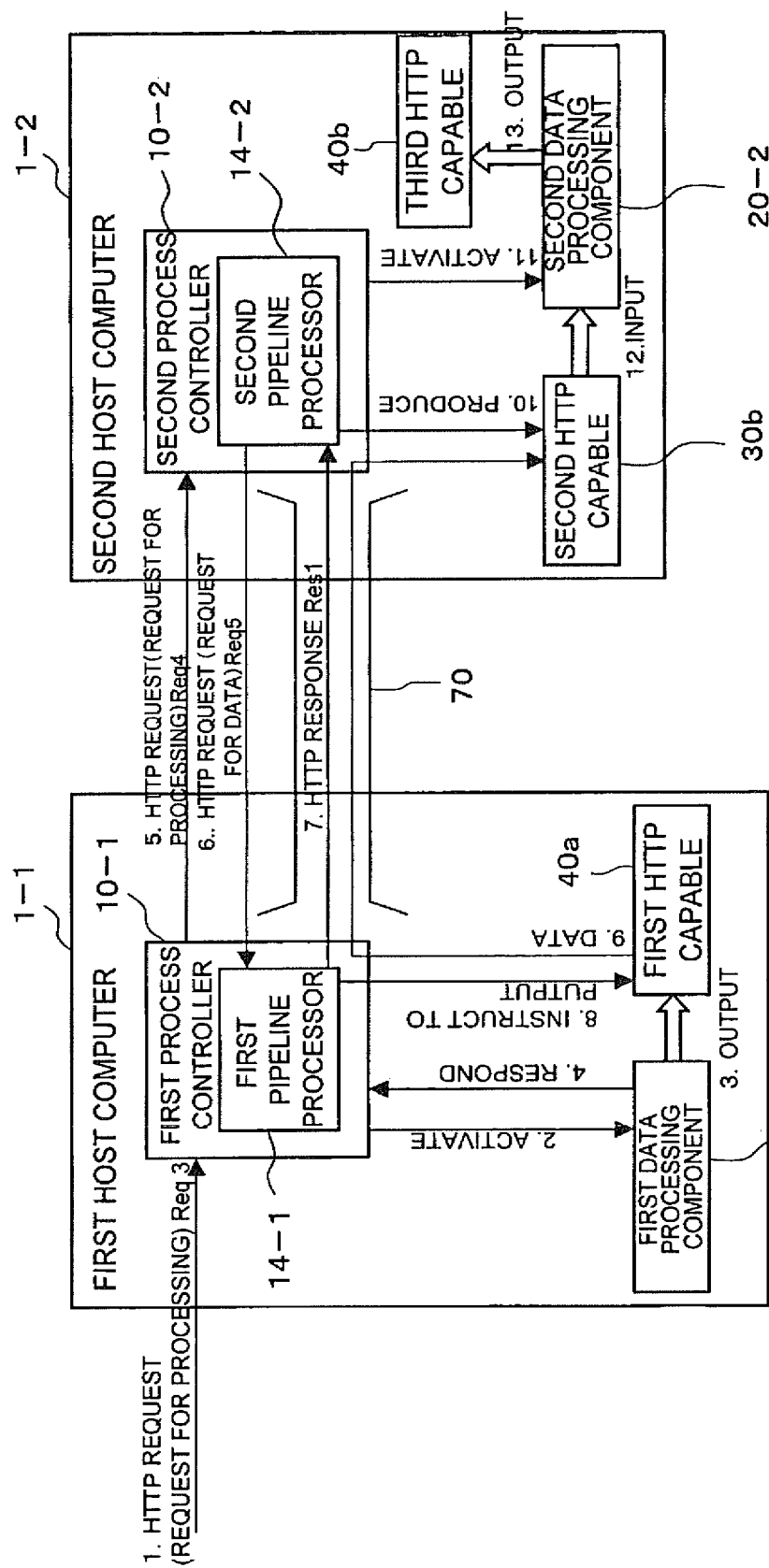
FIG. 5 is a diagram for describing a flow of a cooperative process used when an intermediate result is passed in a Pull method.
Figure 8:
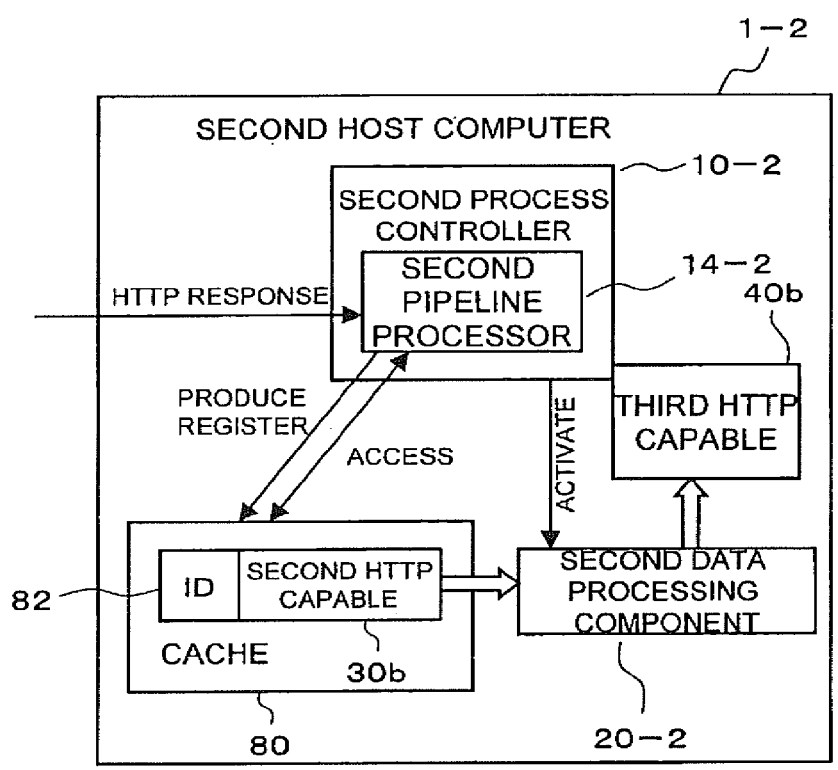
FIG. 8 shows a configuration of a host computer provided with a cache for an HTTP capable object according to a third modification.

The third modification is a modified version of the Pull-method embodiment shown in FIG. 5. In this embodiment, each host 1 (the second host 1-2 is shown as a representative example in the figure) includes a cache 80 for temporarily storing the input-side HTTP capable object as shown in FIG. 8.

The second pipeline processor 14-2 produces the second HTTP capable object 30b, i.e. a replica of the first HTTP capable object 40a (see FIG. 5), from the HTTP response from the first host 1-1, and registers the object 30b in the cache 80 in association with an ID 82. For the cache 80, an object of Java (registered trademark) "HashMap" class and the like can be used. The ID 82 is identifying information uniquely identifying the first HTTP capable object 40a from which the cached object 30b is originated. For the ID 82, the URL or URI (Uniform Resource Identifier) of the first HTTP capable object 40a may be used, for example, but the present invention is not limited thereto.

In the embodiment of FIG. 5, when data to be processed by the second data processing component 20-2 is needed, the second pipeline processor 14-2 issues the HTTP request Req5 for acquiring the first HTTP capable object 40a holding the data to be processed. On the other hand, in the third modification, the second pipeline processor 14-2 searches the cache 80 for the replica (object 30b) of the object 40a before issuing the HTTP request Req5. In this process, the cache 80 is searched using the ID 82, such as the URL, of the object 40a as a key. Because the ID of the object 40a to be acquired is necessary for producing the HTTP request Req5, the second pipeline processor 14-2 knows this, and can perform a search using the ID. If the object 30b corresponding to the ID of the object to be acquired is found from the cache 80 as a result of the search (cache hit), the second pipeline processor 14-2 activates the second data processing component 20-2 using the object 30b as an argument. On the other hand, if there is no hit in the cache 80, the second pipeline processor 14-2 issues the HTTP request Req5 to the first host 1-1 asking for the object 40a, and produces a replica of the object 40a (see FIG. 5).

Note that the cache 80 may also perform maintenance, such as deleting an object left unused for a long time, in accordance with an existing cache maintenance method, such as the LRU (Last Recently Used) method.

According to this modification, when data acquired by a certain host (referred to as the first host) for a certain data processing component (referred to as the first component) from another host is used again by the first component or another data processing component in the first host, data can be acquired from the cache 80, thereby enhancing speed of the process.

Because the process result of each data processing component does not remain in the computer device if the process result of each component is passed through input/output streams as in the related art, it is insufficient for actions requiring examination of the result in the middle of the process, such as debugging. In contrast, according to the third modification, the process result is left in the cache 80, thereby allowing provision of useful information when the result is required in the middle of the process.

Figure 9:
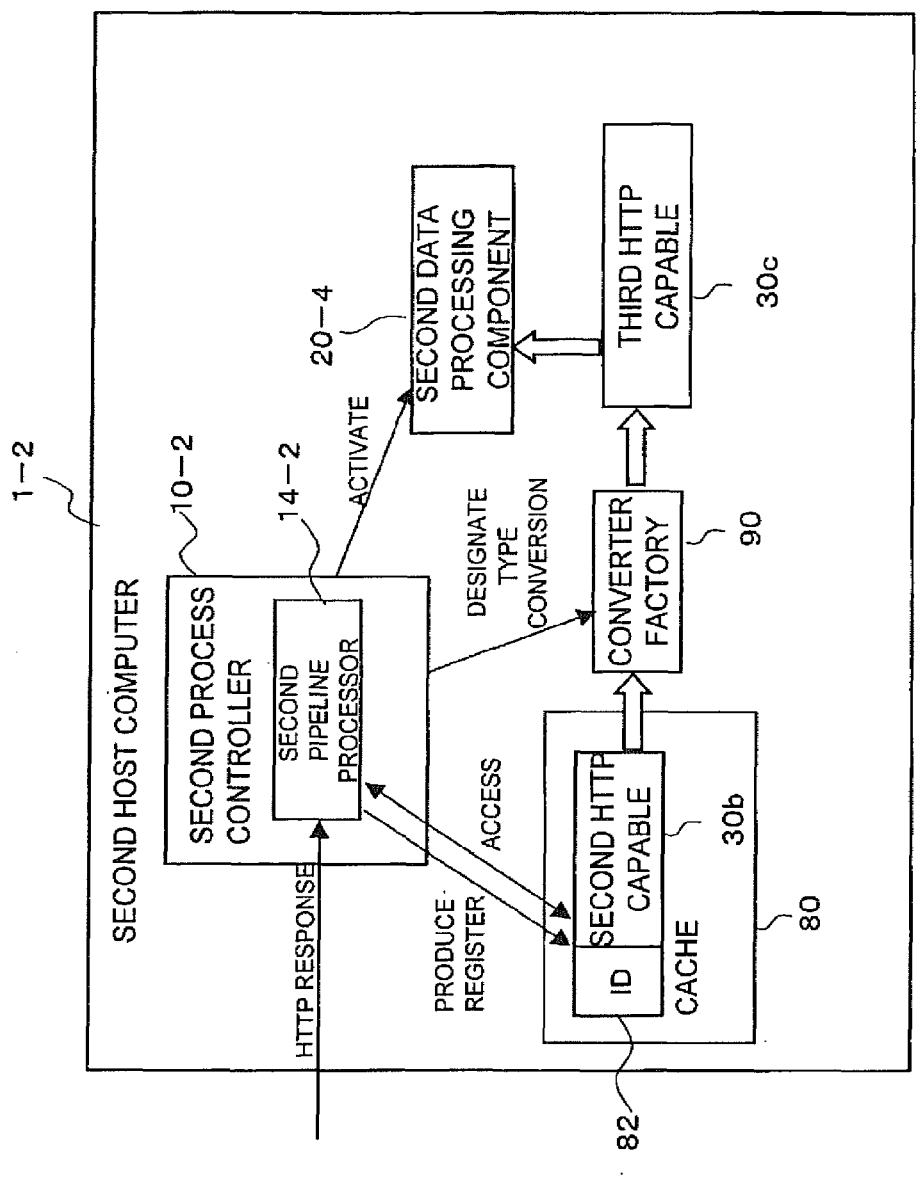
FIG. 9 shows a configuration of a host computer having a converter factory according to a fourth modification.

A fourth modification will next be described with reference to FIG. 9.

Consider a case in which the object 30b acquired for the second data processing component 20-2 (see FIG. 8) and held in the cache 80 in the third modification is later reused by a different data processing component 20-4. In such a case, the data types of the objects used as an argument may be different between the components 20-2 and 20-4. In order to cope with such a situation, a converter factory 90 is provided in the host 1 according to the fourth modification. The converter factory 90 is provided with plural kinds of converter programs for data type conversion, and a conversion table indicating for which data type conversion each converter program can be used. An example of the conversion table is shown below.

| Input Type | Output Type | Converter |
|---|---|---|
| text/xml | text/html | XSLTranslater |
| text/html | text/csv | HTMLTableConverter |
| text/xml | text/csv | XMLTableConverter |

In this table, "Input Type" indicates the data type of the input (i.e. the object in the cache 80) to the converter, and "Output Type" indicates the output of the converter (i.e. the data type of the argument of the data processing component which is to use the object). Further, "Converter" indicates an identifier of the converter program for converting "Input Type" to "Output Type". For example, HTMLTableConverter analyzes HTML data, obtains and interprets Table elements to produce and output a table in CSV format. Conversion of the HTML Table elements into CSV format can be achieved by existing applications (such as HC95; http://www.smfknife.com/ht/hc95.php) designed for this purpose. The same applies to XMLTableConverter.

When the second HTTP capable object 30b is found from the cache 80 as the data used for the process performed by the data processing component 20-4, the second pipeline processor 14-2 inquires of the component 20-4 or the second process controller 10-2 as to the data type of the argument taken by the component 20-4. The processor 14-2 then identifies from the conversion table the converter having the same input type as the data type of the object 30b and the same output type as the data type of the argument of the data processing component 20-4. By activating the identified converter, the third HTTP capable object 30c compatible with the input data type of the data processing component 20-4 is produced from the object 30b, and used as the argument of the data processing component 20-4.

The fourth modification can be used for applications including the following example. It is well known to convert XML (text/xml) data to HTML (text/html) data with an XSL processor by designating the XSLT (Extensible Stylesheet Language Transformations) style. When the data type of the object 30b in the cache 80 is text/xml and the type of data the data processing component 20-4 awaits is text/html, the converter factory 90 chooses the converter "XSLTranslater" from the above conversion table, and uses the converter to obtain the object 30c.

In the related art, when data is passed between data processing components having different signatures (the type and arrangement of data input or output by the data processing component) of data entity, a type mismatch occurs in the data processing component in the subsequent stage, thereby preventing cooperative processing. In contrast, in the fourth modification, the preceding and subsequent components can perform a cooperative process if the combination of the signatures thereof is one that can be converted by the converter factory 90.

While the cache 80 is provided for each host 1 in the above third and fourth modifications, alternatively a cache server performing the function of the cache 80 may be provided on the network. In such a configuration, data is transferred in the above-described Push method from the host 1 to the cache server, thereby transmitting a replica of the output-side HTTP capable object, i.e. the process result of the data processing component in the host 1, to the cache server. The cache server stores the replica in association with the ID of that output-side HTTP capable object. When data to be processed by the data processing component in the host 1 becomes necessary, the pipeline processor 1 of the host 1 first attempts to acquire data from the cache server, and if the attempt fails, acquires it from the host 1 having that data to be processed.

While an example in which HTTP is used for passing data between hosts has been described, the present invention is not limited to HTTP, but is applicable to general protocols for passing data between hosts as a stream.

The host computers 1-1 and 1-2 in the above embodiments can generally be implemented by allowing a general-purpose computer to execute a program reciting the above-described functions of the host computer 1-1 or 1-2. This program is typically provided in a recorded state within a storage medium readable by a computer, such as optical disks including CD-ROM and DVD-ROM, magnetic disks including a floppy (trademark) disk or a hard drive.

While the invention has been described in conjunction with specific embodiments, it will be evident to those skilled in the art that modifications may be made thereto in light of the foregoing description. Accordingly, it is intended that the appended claims cover all such modifications that fall within the spirit and scope of the invention.

The entire disclosure of Japanese Application No. 2005-185416 filed on Jun. 24, 2005 including the specification, claims, drawings, and abstract is incorporated herein by reference.

According to an aspect of the invention, there is provided a cooperative processing system that includes a first data processing component, existing on a first computer, that generates an output containing object having a function of outputting data contained therein to a stream, a pipeline section that causes the output containing object to output the data contained in the output containing object to a stream addressed to a second computer, and causes the second computer to generate an input containing object that receives the stream and stores data transferred through the stream, and a second data processing component, existing on the second computer, that receives the input containing object to perform a data process.

According to another aspect of the invention, the pipeline section may include an output-side pipe section existing on the first computer, and an input-side pipe section existing on the second computer, when the second data processing component executes a process, the input-side pipe section may issue to the output-side pipe section a data request for the output containing object that contains data necessary for the process, the output-side pipe section may issue a response to the data request from the input-side pipe section to cause the requested output containing object to output the data contained therein to a stream of the response, and the input-side pipe section may produce the input containing object that receives the stream of the response from the output-side pipe section and stores the data transferred through the stream.

According to another aspect of the invention, the pipeline section may further include a cache section for storing the input containing object associated with the output containing object from which the input containing object is produced, and when the second data processing component performs the data process, the input-side pipe section may search the cache section for the input containing object associated with the output containing object that contains data necessary for the process prior to issuance of the data request, and, if the corresponding input containing object is found, may not issue the data request and provides the input containing object thus found to the second data processing component.

According to another aspect of the invention, when a data type of the input containing object stored in the cache section is different from an input data type of the second data processing component which processes the data contained in the input containing object, the pipeline section may perform type conversion on the input containing object to the input data type, and provide an object produced as a result of the type conversion to the second data processing component.

According to another aspect of the invention, the pipeline section may include an output-side pipe section existing on the first computer, and an input-side pipe section existing on the second computer, the output-side pipe section may issue a request to the input-side pipe section, and cause the output containing object to output the data contained therein to a stream of the request, and the input-side pipe section may produce the input containing object that receives the stream of the request from the output-side pipe section and store the data transferred through the stream.

According to another aspect of the invention, the output containing object and the input containing object may each have a data type, the pipeline section may have an object factory that produces the input containing object on the second computer, and the object factory may have a function of producing a plurality of kinds of input containing objects with different data types, and produce the input containing object of the data type corresponding to the data type of the output containing object among the plurality of kinds of input containing objects.

According to another aspect of the invention, the second data processing component may receive the input containing object as an argument to perform the process, the output containing object and the input containing object may each have a data type, the pipeline section may have an object factory that produces the input containing object on the second computer, and the object factory may have a function of producing a plurality of kinds of input containing objects with different data types, and produce the input containing object of the data type corresponding to the data type of the argument of the second data processing component.

According to another aspect of the invention, the input containing object may be an instance of an input containing object class or a descendant class inheriting the class, and the input containing object class may have a constructor method for receiving the stream, and producing the input containing object containing the data transferred through the stream.

According to another aspect of the invention, the output containing object may be an instance of an output containing object class or a descendant class inheriting the class, and the output containing object class may have a data output method for outputting the data contained in the output containing object to the stream.

According to another aspect of the invention, the output containing object and the input containing object may be instances of a data containing object class or a descendant class inheriting the class, and the data containing object class may have a constructor method for receiving the stream, and producing an instance of the data containing object class containing the data transferred through the stream as the input containing object, and a data output method for outputting to the stream the data contained in the instance of the data containing object class as the output containing object.

According to another aspect of the invention, the stream may be a data stream formed in response to issuance of an HTTP request or an HTTP response.

According to another aspect of the invention, there is provided a storage medium readable by a first computer. The storage medium stores a program of instructions executable by the first computer to cause a first computer to perform a function as a first data processing component that executes a first data process, and outputs an output containing object having a function of outputting data obtained through the first process as a stream, and an output-side pipe section that causes the output containing object to output the data contained in the output containing object as a stream addressed to a second computer when the data obtained through the first process executed is provided to a second data processing component on the second computer to execute a second data process.

According to another aspect of the invention, the program may include instructions to cause the first computer to perform a function as an input-side pipe section that may produce an input containing object that receives a stream from an external device and store input data transferred through the stream, and a process instructing section that may cause the first data processing component to process the input data by inputting the input containing object to the first data processing component.

According to another aspect of the invention, when the first data processing component is caused to execute a process, the input-side pipe section may transmit a data request for data necessary for the process to the external device containing the data, and produce the input containing object that receives a stream of a response to the data request.

According to another aspect of the invention, the input-side pipe section may include a cache section that stores the produced input containing object associated with the data from which the input containing object is produced, and when the first data processing component is caused to execute a process, the input-side pipe section may search the cache section for the input containing object associated with the data necessary for the process prior to issuance of the data request, and, if the corresponding input containing object is found, may not issue the data request, and provides the input containing object thus found to the second data processing component.

According to another aspect of the invention, when a data type of the input containing object stored in the cache section is different from an input data type of the first data which processes component processing the data contained in the input containing object, the input-side pipe section may perform type conversion on the input containing object to the input data type, and provide an object produced as a result of the type conversion to the first data processing component.

According to another aspect of the invention, the output-side pipe section may issue a request to the second computer asking for execution of the second data processing component, and cause the output containing object to output the data contained therein to a stream of the request.

According to another aspect of the invention, the output containing object may output to the stream type information indicating its own data type in addition to the data contained therein.

According to another aspect of the invention, the input-side pipe section may produce the input containing object having the data type corresponding to the data type of the data transferred through the stream.

According to another aspect of the invention, a process instructing section may cause the first data processing component to process the input data by inputting the input containing object as an argument to the first data processing component, and the input-side pipe section may produce the input containing object of the data type corresponding to the data type of the argument of the first data processing component.

According to another aspect of the invention, the program may further include an instruction to cause the first computer to perform a function as a third data processing component executing a third process, and when the third data processing component performs the process by receiving the data obtained through the first process executed by the first data processing component, the output-side pipe section may activate the third data processing component by designating the output containing object as input data.

According to another aspect of the invention, the input containing object may be an instance of an input containing object class or a descendant class inheriting the class, and the input containing object class may have a constructor method for receiving the stream, and producing the input containing object containing the data transferred through the stream.

According to another aspect of the invention, the output containing object may be an instance of an output containing object class or a descendant class inheriting the class, and the output containing object class may have a data output method for outputting the data contained in the output containing object to the stream.

According to another aspect of the invention, the output containing object and the input containing object may be instances of a data containing object class or a descendant class inheriting the class, and the data containing object class may have a constructor method for receiving the stream, and producing an instance of the data containing object class that contains the data transferred through the stream as the input containing object, and a data output method for outputting to the stream the data contained in the instance of the data containing object class as the output containing object.

According to another aspect of the invention, the stream may be a data stream formed in response to issuance of an HTTP request or an HTTP response.

According to another aspect of the invention, there is provided a storage medium readable by a computer. The storage medium stores a program of instructions executable by the computer to cause the computer to perform a function. The function includes producing an input containing object that receives a stream from an external device and stores data transferred through the stream, receiving the stream from an external device, and executing a data processing using the input containing object.

According to another aspect of the invention, there is provided a computer device that includes a first data processing component that executes a first process, and outputs an output containing object having a function of outputting data obtained through the first process as a stream, and an output-side pipe section that causes the output containing object to output the data contained in the output containing object as a stream addressed to a second computer device when the data obtained through the first process is provided to a second data processing component on the second computer device to execute a second process.

According to another aspect of the invention, there is provided a computer device that includes a first data processing component that executes a first process, an input-side pipe section that produces an input containing object that receives a stream from an external device and stores input data transferred through the stream, and a process instructing section that causes the first data processing component to process the input data by inputting the input containing object to the first data processing component.

According to another aspect of the invention, there is provided a cooperative processing method that includes generating an output containing object as an output of a first data processing, outputting data contained in the output containing object to a stream addressed to a second computer, generating an input containing object that receives the stream and stores the data transferred through the stream, outputting the data contained in the input containing object, and executing a second data processing using the data outputted from the input containing object.

What is claimed is:

1. A cooperative processing system, comprising:
a plurality of data processing components;
said plurality of data processing components including,
a first data processing component, existing on a first computer, that executes a first data process and generates an output-side HTTP capable object, the output-side HTTP capable object being associated with a data type which is a same data type of data obtained through the first data process, the output-side HTTP capable object containing data,
a pipeline section that causes the output-side HTTP capable object to output the data contained in the output-side HTTP capable object to a stream addressed to a second computer, and causes the second computer to generate an input-side HTTP capable object, the input-side HTTP capable object receiving the stream and storing data transferred through the stream, and
a second data processing component, existing on the second computer, that receives the input-side HTTP capable object to perform a data process;
said first data processing component invoking an object of a process controller class and identifying a script as an argument to the process controller class which specifies an order of processes performed by said plurality of data processing components.

2. The cooperative processing system according to claim 1, wherein the pipeline section includes an output-side pipe section existing on the first computer, and an input-side pipe section existing on the second computer, when the second data processing component executes a process, the input-side pipe section issues to the output-side pipe section a data request for the output-side HTTP capable-object that contains data necessary for the process, the output-side pipe section issues a response to the data request from the input-side pipe section to cause the requested output-side HTTP capable object to output the data contained therein to a stream of the response, and the input-side pipe section produces the input-side HTTP capable object that receives the stream of the response from the output-side pipe section and stores the data transferred through the stream.

3. The cooperative processing system according to claim 2, wherein the pipeline section further includes a cache section for storing the input-side HTTP capable object associated with the output-side HTTP capable object from which the input-side HTTP capable object is produced, and when the second data processing component performs the data process, the input-side pipe section searches the cache section for the input-side HTTP capable object associated with the output-side HTTP capable object that contains data necessary for the process prior to issuance of the data request, and, if the corresponding input-side HTTP capable object is found, does not issue the data request and provides the input-side HTTP capable object thus found to the second data processing component.

4. The cooperative processing system according to claim 3, wherein when a data type of the input-side HTTP capable object stored in the cache section is different from an input data type of the second data processing component which processes the data contained in the input-side HTTP capable object, the pipeline section performs type conversion on the input-side HTTP capable object to the input data type, and provides an object produced as a result of the type conversion to the second data processing component.

5. The cooperative processing system according to claim 1, wherein the pipeline section includes an output-side pipe section existing on the first computer, and an input-side pipe section existing on the second computer, the output-side pipe section issues a request to the input-side pipe section, and causes the output-side HTTP capable object to output the data contained therein to a stream of the request, and the input-side pipe section produces the input-side HTTP capable object that receives the stream of the request from the output-side pipe section and stores the data transferred through the stream.

6. The cooperative processing system according to claim 1, wherein output-side HTTP capable object and the input-side HTTP capable object each have a data type, the pipeline section has an object factory that produces the input-side HTTP capable object on the second computer, and the object factory has a function of producing a plurality of kinds of input-side HTTP capable objects with different data types, and produces the input-side HTTP capable object of the data type corresponding to the data type of the output-side HTTP capable object among the plurality of kinds of input-side HTTP capable objects.

7. The cooperative processing system according to claim 1, wherein the second data processing component receives the input-side HTTP capable object as an argument to perform the process, the output-side HTTP capable-object and the input-side HTTP capable object each have a data type, the pipeline section has an object factory that produces the input-side HTTP capable object on the second computer, and the object factory has a function of producing a plurality of kinds of input-side HTTP capable objects with different data types, and produces the input-side HTTP capable object of the data type corresponding to the data type of the argument of the second data processing component.

8. The cooperative processing system according to claim 1, wherein the input-side HTTP capable object is an instance of an input-side HTTP capable object class or a descendant class inheriting the class, and the input-side HTTP capable object class has a constructor method for receiving the stream, and producing the input-side HTTP capable object containing the data transferred through the stream.

9. The cooperative processing system according to claim 1, wherein the output-side HTTP capable object is an instance of an output-side HTTP capable object class or a descendant class inheriting the class, and the output-side HTTP capable object has a data output method for outputting the data contained in the output-side HTTP capable object to the stream.

10. The cooperative processing system according to claim 1, wherein the output-side HTTP capable object and the input-side HTTP capable-object are instances of a data containing object class or a descendant class inheriting the class, and the data containing object class has a constructor method for receiving the stream, and producing an instance of the data containing object class containing the data transferred through the stream as the input-side HTTP capable object, and a data output method for outputting to the stream the data contained in the instance of the data containing object class as the output-side HTTP capable object.

11. The cooperative processing system according to claim 1, wherein the stream is a data stream formed in response to issuance of an HTTP request or an HTTP response.

12. A storage memory, readable by a first computer, the first computer being part of a cooperative processing system having a plurality of data processing components, the storage memory storing a program of instructions executable by the first computer to cause a first computer to perform a function as:
 a first data processing component that executes a first data process, and outputs an output-side HTTP capable object, the output-side HTTP capable object being associated with a data type which is a same data type of data obtained through the first data process; and
 an output-side pipe section that causes the output-side HTTP capable object to output the data contained in the output-side HTTP capable object to a stream addressed to a second computer when the data obtained through the first process executed is provided to a second data processing component on the second computer to execute a second data process;
 said first data processing component invoking an object of a process controller class and identifying a script as an argument to the process controller Class which specifies an order of processes performed by a plurality of data processing components.

13. The storage memory according to claim 12, wherein the program comprises instructions to cause the first computer to perform a function as: an input-side pipe section that produces an input-side HTTP capable object that receives a stream from an external device and stores input data transferred through the stream, and a process instructing section that causes the first data processing component to process the input data by inputting the input-side HTTP capable object to the first data processing component.

14. The storage memory according to claim 13, wherein when the first data processing component is caused to execute a process, the input-side pipe section transmits a data request for data necessary for the process to the external device containing the data, and produces the input-side HTTP capable object that receives a stream of a response to the data request.

15. The storage memory according to claim 14, wherein the input-side pipe section includes a cache section that stores the produced input-side HTTP capable object associated with the data from which the input-side HTTP capable-object is produced, and when the first data processing component is caused to execute a process, the input-side pipe section searches the cache section for the input-side HTTP capable object associated with the data necessary for the process prior to issuance of the data request, and, if the corresponding input-side HTTP capable object is found, does not issue the data request, and provides the input-side HTTP capable-object thus found to the second data processing component.

16. The storage memory according to claim 15, wherein when a data type of the input-side HTTP capable object stored in the cache section is different from an input data type of the first data which processes component processing the data contained in the input-side HTTP capable object, the input-side pipe section performs type conversion on the input-side HTTP capable object to the input data type, and provides an object produced as a result of the type conversion to the first data processing component.

17. The storage memory according to claim 12, wherein the output-side pipe section issues a request to the second computer asking for execution of the second data processing component, and causes the output-side HTTP capable object to output the data contained therein to a stream of the request.

18. The storage memory according to claim 12, wherein the output-side HTTP capable object outputs to the stream type information indicating its own data type in addition to the data contained therein.

19. The storage memory according to claim 13, wherein the input-side pipe section produces the input-side HTTP capable object having the data type corresponding to the data type of the data transferred through the stream.

20. The storage memory according to claim 13, wherein the process instructing section causes the first data processing component to process the input data by inputting the input-side HTTP capable object as an argument to the first data processing component, and the input-side pipe section produces the input-side HTTP capable object of the data type corresponding to the data type of the argument of the first data processing component.

21. The storage memory according to claim 12, wherein the program further comprises an instruction to cause the first computer to perform a function as a third data processing component executing a third process, and when the third data processing component performs the process by receiving the data obtained through the first process executed by the first data processing component, the output-side pipe section activates the third data processing component by designating the output-side HTTP capable object as input data.

22. The storage memory according to claim 13, wherein the input-side HTTP capable object is an instance of an input-side HTTP capable object class or a descendant class inheriting the class, and the input-side HTTP capable object class has a constructor method for receiving the stream, and producing the input-side HTTP capable object containing the data transferred through the stream.

23. The storage memory according to claim 12, wherein the output-side HTTP capable object is an instance of an output-side HTTP capable-object class or a descendant class inheriting the class, and the output-side HTTP capable object class has a data output method for outputting the data contained in the output-side HTTP capable object to the stream.

24. The storage memory according to claim 13, wherein the output-side HTTP capable object and the input-side HTTP capable object are instances of a data containing object class or a descendant class inheriting the class, and the data containing object class has a constructor method for receiving the stream, and producing an instance of the data containing object class that contains the data transferred through the stream as the input-side HTTP capable object, and a data output method for outputting to the stream the data contained in the instance of the data containing object class as the output-side HTTP capable object.

25. The storage memory according to claim 12, wherein the stream is a data stream formed in response to issuance of an HTTP request or an HTTP response.

26. A storage memory, readable by a computer, the computer being part of a cooperative processing system having a plurality of data processing components, the storage memory storing a program of instructions executable by the computer to cause the computer to perform a function comprising:
    producing an input-side HTTP capable object, the input-side HTTP capable object being associated with a data type;
    receiving, through the input-side HTTP capable object, data from a stream from au external device;
    storing, in the input-side HTTP capable object, the data received from the stream in the data type; and
    executing a data processing using the data stored in the input-side HTTP capable object;
    invoking an object of a process controller class; and
    identifying a script as an argument to the process controller class which specifies an order of processes performed by a plurality of data processing components.

27. A computer device, the computer device being part of a cooperative processing system having a plurality of data processing components, comprising:
    a first data processing component that executes a first data process, and outputs an output-side HTTP capable object, the output-side HTTP capable object being associated with a data type which is a same data type of data obtained through the first data process; and
    an output-side pipe section that causes the output-side HTTP capable object to output the data contained in the output-side HTTP capable object as a stream addressed to a second computer device when the data obtained through the first process is provided to a second data processing component on the second computer device to execute a second process;
    said first data processing component invoking an object of a process controller class and identifying a script as an argument to the process controller class which specifies an order of processes performed by the plurality of data processing components.

28. A computer device, the computer device being part of a cooperative processing system having a plurality of data processing components, comprising:
    a first data processing component that executes a first process;
    an input-side pipe section that produces an input-side HTTP capable object, the input-side HTTP capable object being associated with a data type, the input-side HTTP capable object receiving data from a stream from an external device, the input-side HTTP capable object storing the data received from the stream in the data type; and
    a process instructing section that causes the first data processing component to process the data stored in the input-side HTTP capable object in the data type;
    said first data processing component invoking an object of a process controller class and identifying a script as an argument to the process controller class which specifies an order of processes performed by the plurality of data processing components.

29. A cooperative processing method for a cooperative processing system having a plurality of data processing components, the method, comprising:
    generating, at a first computer, an output-side HTTP capable object, the output-side HTTP capable object being associated with a data type which is a same data type of data obtained through the first data process, the output-side HTTP capable object outputting data obtained through the first data processing, the output-side HTTP capable object containing data generated by the first data processing;

outputting the data contained in the output-side HTTP capable object to a stream addressed to a second computer;

generating, at the second computer, an input-side HTTP capable object, the input-side HTTP capable object being associated with a same data type as the data type associated with the output-side HTTP capable object, the input-side HTTP capable object receiving the data from the stream, the input-side HTTP capable object storing the data received from the stream;

outputting the data contained in the input-side HTTP capable object, a data type of the output data being a same data type associated with the input-side HTTP capable object; and executing a second data processing using the data outputted from the input-side HTTP capable object;

invoking an object of a process controller class; and identifying a script as an argument to the process controller class which specifies an order of processes performed by the plurality of data processing components.

* * * * *